United States Patent
Tsukuda et al.

(10) Patent No.: US 10,301,147 B2
(45) Date of Patent: May 28, 2019

(54) SEPARATOR CORE AND SEPARATOR ROLL

(71) Applicant: Sumitomo Chemical Company, Limited, Tokyo (JP)

(72) Inventors: Yosuke Tsukuda, Niihama (JP); Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/637,404

(22) Filed: Jun. 29, 2017

(65) Prior Publication Data

US 2018/0002137 A1 Jan. 4, 2018

(30) Foreign Application Priority Data

Jun. 30, 2016 (JP) .............................. 2016-003128 U (51) Int. Cl.
  *H01M 2/14* (2006.01)
  *H01M 2/16* (2006.01)
  *H01M 2/18* (2006.01)
  *B65H 75/10* (2006.01)
  *H01G 11/52* (2013.01)
  *H01M 8/0289* (2016.01)

(52) U.S. Cl.
  CPC ............ *B65H 75/10* (2013.01); *H01M 2/145* (2013.01); *H01M 2/1653* (2013.01); *H01M 2/18* (2013.01); *B65H 2701/52* (2013.01); *H01G 11/52* (2013.01); *H01M 2/1686* (2013.01); *H01M 8/0289* (2013.01)

(58) Field of Classification Search
  CPC ... B65H 75/10; B65H 2701/52; H01M 2/145; H01M 2/1653; H01M 2/1686; H01M 2/18; H01M 8/0289; H01G 11/52
  See application file for complete search history.

(56) References Cited

U.S. PATENT DOCUMENTS

2014/0322585 A1 10/2014 Iizuka et al.

FOREIGN PATENT DOCUMENTS

JP 2013139340 A 7/2013

*Primary Examiner* — Brittany L Raymond
(74) *Attorney, Agent, or Firm* — Panitch Schwarze Bellisario & Nadel LLP (57) ABSTRACT

The present invention achieves a separator core that is easy to clean and that will have no or few remaining foreign substances and a separator roll obtained by winding a separator around the separator core. Provided is a separator core around which a separator is wound or is to be wound, in which at least one of (i) a connection between a surface of a support part and the inner peripheral surface of the outer cylindrical part and (ii) a connection between the surface of the support part and the outer peripheral surface of the inner cylindrical part is made smoothly by a curved face.

12 Claims, 8 Drawing Sheets

SEPARATOR CORE AND SEPARATOR ROLL

This Nonprovisional application claims priority under 35 U.S.C. § 119(a) on Utility Model Application No. 2016-003128 filed in Japan on Jun. 30, 2016, the entire contents of which are hereby incorporated by reference.

TECHNICAL FIELD

The present invention relates to a separator core around which a separator for a nonaqueous electrolyte secondary battery is wound or is to be wound and a separator roll obtained by winding a separator for a nonaqueous electrolyte secondary battery around a separator core.

BACKGROUND ART

Patent Literature 1 discloses an example of the shape of a separator core (hereinafter may be referred to as the "core"). When a separator is transported by a transport system such as a roller and continuously produced, the resulting separator is wound around this separator core to be supplied as a product.

The core disclosed in Patent Literature 1 has an outer cylindrical part around which a separator is wound, an inner cylindrical part which serves as a bearing for a shaft, and support parts which are connected to the outer cylindrical part and the inner cylindrical part (such support parts may be hereinafter referred to as "ribs"). The produced separator is supplied in the form of a roll, which is obtained by winding the separator around the outer cylindrical part.

CITATION LIST

Patent literature

[Patent Literature 1]
Japanese Patent Application Publication, Tokukai No. 2013-139340 (Publication date: Jul. 18, 2013)

SUMMARY OF INVENTION

Technical Problem

The separator for a nonaqueous electrolyte secondary battery is wound off from the separator roll and used and, after the separator for a nonaqueous electrolyte secondary battery is entirely wound off from the separator roll, the core is cleaned and another separator for a nonaqueous electrolyte secondary battery is wound around the core. In this way, the core is reused.

However, in the above-described core, there are sharp corners between a surface of a rib and a surface of the outer cylindrical part and between the surface of the rib and a surface of the inner cylindrical part. When cleaning is performed to remove foreign substances, a cleaning member may not reach the innermost portion of such a sharp corner and the foreign substances may remain in the corner.

If a separator roll is produced using a core in which foreign substances are remaining in the corner, the foreign substances on the core may adhere to the separator for a nonaqueous electrolyte secondary battery and the separator for a nonaqueous electrolyte secondary battery may become defective.

The present invention was made in view of the above problems, and it is an object of the present invention to provide a separator core that is easy to clean and that will have no or few remaining foreign substances and a rolled product (hereinafter referred to as a "roll") obtained by winding a separator around the separator core.

Solution to Problem

In order to attain the above object, a separator core in accordance with an aspect of the present invention is a separator core around which a separator for a nonaqueous electrolyte secondary battery is wound or is to be wound, including: an outer cylindrical part; an inner cylindrical part provided inside the outer cylindrical part; and support parts that are provided between the outer cylindrical part and the inner cylindrical part and that extend in radial directions to connect to the outer cylindrical part and the inner cylindrical part, wherein at least one of (i) a connection between a surface of at least one of the support parts and an inner peripheral surface of the outer cylindrical part and (ii) a connection between the surface of the at least one of the support parts and an outer peripheral surface of the inner cylindrical part is made smoothly by a curved face.

Advantageous Effects of Invention

According to embodiments of the present invention, it is possible to provide a separator core that is easy to clean and that will have no or few remaining foreign substances and a separator roll that supplies a separator for a nonaqueous electrolyte secondary battery wound around the separator core. It is also possible to produce such a separator roll.

DESCRIPTION OF EMBODIMENTS

The following describes embodiments of the present invention in detail with reference to FIGS. 1 to 8. In the following description, a heat-resistant separator for a battery such as a lithium-ion secondary battery is used as an example of a separator for a nonaqueous electrolyte secondary battery wound around a separator core (core) in accordance with an embodiment of the present invention.

<Configuration of Lithium-Ion Secondary Battery>

Figure 1:
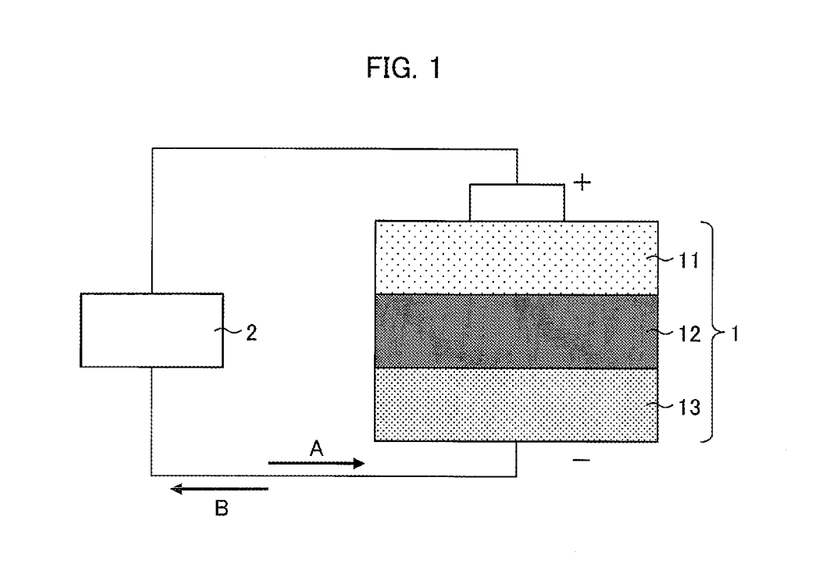
FIG. 1 schematically illustrates a cross sectional configuration of a lithium-ion secondary battery.
Figure 2:
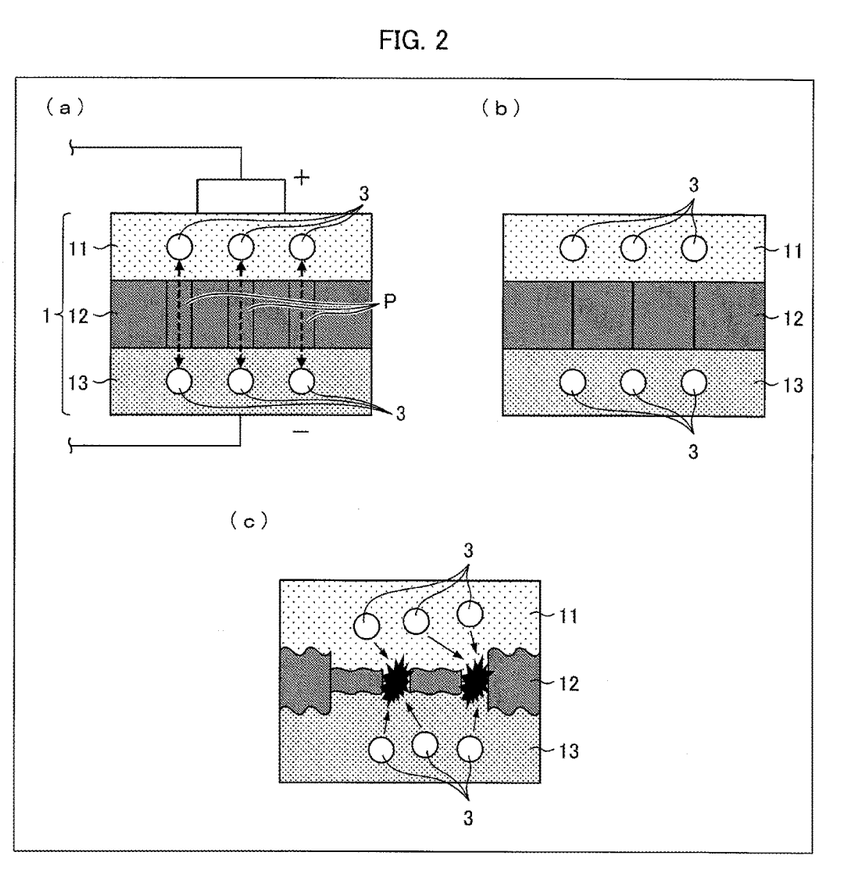
FIG. 2 schematically illustrates states of the lithium-ion secondary battery illustrated in FIG. 1
Figure 3:
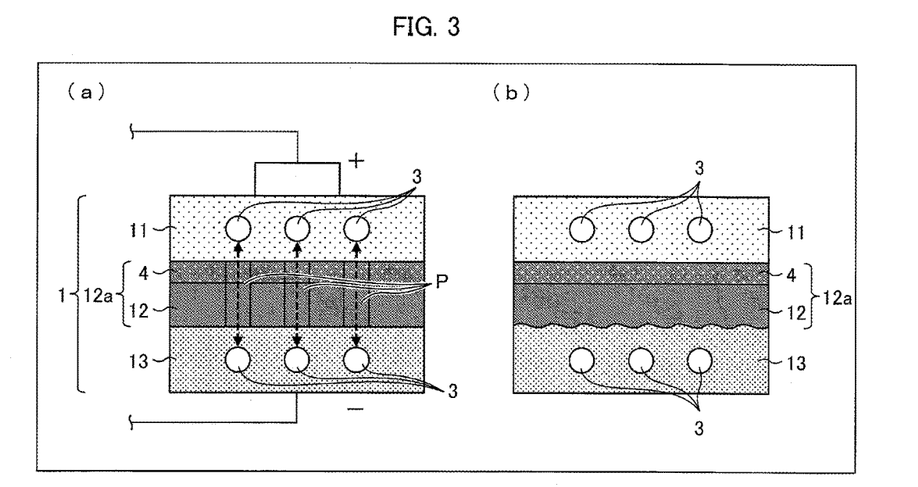
FIG. 3 schematically illustrates states of a lithium-ion secondary battery having another configuration.

First, the following describes a lithium-ion secondary battery with reference to FIGS. 1 to 3.

A nonaqueous electrolyte secondary battery, typified by a lithium-ion secondary battery, has a high energy density, and therefore is currently and widely used as (i) batteries for use in devices such as personal computers, mobile phones, and mobile information terminals, and moving bodies such as automobiles and airplanes, and (ii) stationary batteries contributing to stable power supply.

FIG. 1 schematically illustrates a cross sectional configuration of a lithium-ion secondary battery 1.

As illustrated in FIG. 1, the lithium-ion secondary battery 1 includes a cathode 11, a separator 12, and an anode 13. Outside the lithium-ion secondary battery 1, an external device 2 is connected to the cathode 11 and the anode 13. Electrons move in a direction A while the lithium-ion secondary battery 1 is being charged, and the electrons move in a direction B while the lithium-ion secondary battery 1 is being discharged.

<Separator>

The separator 12 is provided so as to be sandwiched between (i) the cathode 11 which is a positive electrode of the lithium-ion secondary battery 1 and (ii) the anode 13 which is a negative electrode of the lithium-ion secondary battery 1. The separator 12 allows lithium ions to move between the cathode 11 and the anode 13 while the separator 12 separates the cathode 11 from the anode 13. The separator 12 is made of, for example, a polyolefin such as polyethylene or polypropylene.

FIG. 2 schematically illustrates states of the lithium-ion secondary battery 1 illustrated in FIG. 1. (a) of FIG. 2 illustrates a normal state. (b) of FIG. 2 illustrates a state in which the temperature of the lithium-ion secondary battery 1 has risen. (c) of FIG. 2 illustrates a state in which the temperature of the lithium-ion secondary battery 1 has sharply risen.

As illustrated in (a) of FIG. 2, the separator 12 has many pores P. Normally, lithium ions 3 can move back and forth in the lithium-ion secondary battery 1 through the pores P.

The temperature of the lithium-ion secondary battery 1 may rise due to, for example, excessive charging of the lithium-ion secondary battery 1 or a high current caused by short-circuiting of an external device. This causes the separator 12 to be melt or soften, so that the pores P are blocked as illustrated in (b) of FIG. 2. As a result, the separator 12 shrinks. This causes the lithium ions 3 to stop moving back and forth, and ultimately causes the temperature of the lithium-ion secondary battery 1 to stop rising.

Note, however, that in a case where the temperature of the lithium-ion secondary battery 1 sharply rises, the separator 12 suddenly shrinks. In this case, the separator 12 may be destroyed (see (c) of FIG. 2). This causes the lithium ions 3 to leak out from the separator 12 which has been destroyed. As a result, the lithium ions 3 will never stop moving back and forth. Consequently, the temperature of the lithium-ion secondary battery 1 continues to rise.

<Heat-Resistant Separator>

FIG. 3 schematically illustrates states of a lithium-ion secondary battery 1 having another configuration. (a) of FIG. 3 illustrates a normal state, and (b) of FIG. 3 illustrates a state in which the temperature of the lithium-ion secondary battery 1 has sharply risen.

As illustrated in (a) of FIG. 3, the lithium-ion secondary battery 1 may further include a heat-resistant layer 4. This heat-resistant layer 4 may be provided on the separator 12. (a) of FIG. 3 illustrates a configuration in which the separator 12 is provided with the heat-resistant layer 4 serving as a functional layer. Hereinafter, a film in which the separator 12 is provided with the heat-resistant layer 4 is referred to as a heat-resistant separator 12a, which is an example of a functional layer-attached separator. The separator 12 of the functional layer-attached separator is a base material whereas the heat-resistant layer 4 is the functional layer.

According to the configuration illustrated in (a) of FIG. 3, the heat-resistant layer 4 is stacked on a surface of the separator 12 which surface faces the cathode 11. Note that the heat-resistant layer 4 can be alternatively stacked (i) on a surface of the separator 12 which surface faces the anode 13 or (ii) on the both surfaces of the separator 12. The heat-resistant layer 4 has pores which are similar to pores P. Normally, lithium ions 3 move back and forth through the pores P and the pores of the heat-resistant layer 4. Materials of the heat-resistant layer 4 include, for example, wholly aromatic polyamide (aramid resin).

Even in a case where the separator 12 melts or softens due to a sharp rise in temperature of the lithium-ion secondary battery 1, the shape of the separator 12 is maintained (see (b) of FIG. 3) because the heat-resistant layer 4 supports the separator 12. This causes the separator 12 to come off with melting or softening, so that the pores P only blocks up. This causes the lithium ions 3 to stop moving back and forth, and ultimately causes the above-described excessive discharging or excessive charging to stop. In this way, the separator 12 is prevented from being destroyed.

<Production Steps for Separator and Heat-Resistant Separator>

How to produce the separator and the heat-resistant separator of the lithium-ion secondary battery 1 is not specifically limited. The separator and the heat-resistant separator can be produced by a publicly known method. The following discussion assumes a case where a porous film from which the separator (heat-resistant separator) is made contains polyethylene as a main material. Note, however, that even in a case where the porous film contains another material, the separator (heat-resistant separator) can be produced by a similar production method.

Examples of such a similar production method encompass a method which includes the steps of forming a film by adding inorganic filler or a plasticizer to a thermoplastic resin, and then removing the inorganic filler or the plasticizer with an appropriate solvent. For example, in a case where the porous film is a polyolefin separator made of a polyethylene resin containing ultra-high molecular weight polyethylene, the porous film can be produced by the following method.

This method includes (1) a kneading step of kneading a ultra-high molecular weight polyethylene with (i) an inorganic filler (such as calcium carbonate or silica) or (ii) a plasticizer (such as low molecular weight polyolefin or fluid paraffin) to obtain a polyethylene resin composition, (2) a rolling step of rolling the polyethylene resin composition to form a film thereof, (3) a removal step of removing the inorganic filler or the plasticizer from the film obtained in the step (2), and (4) a stretching step of stretching the film obtained in the step (3) to obtain the porous film. The step (4) can be alternatively carried out between the steps (2) and (3).

In the removal step, many fine pores are formed in the film. The fine pores of the film stretched in the stretching step serve as the above-described pores P. The porous film (separator 12) is thus obtained. Note that the porous film is a polyethylene microporous film having a prescribed thickness and a prescribed air permeability.

Note that, in the kneading step, (i) 100 parts by weight of the ultra-high molecular weight polyethylene, (ii) 5 parts by weight to 200 parts by weight of a low molecular weight polyolefin having a weight-average molecular weight of 10000 or less, and (iii) 100 parts by weight to 400 parts by weight of the inorganic filler can be kneaded.

Thereafter, in a coating step, the heat-resistant layer 4 is formed on a surface of the porous film. For example, by applying, onto the porous film, an aramid/NMP (N-methyl-pyrrolidone) solution (coating solution), the heat-resistant layer 4 that is an aramid heat-resistant layer is formed. The heat-resistant layer 4 may be provided on a single surface or both surfaces of the porous film. Alternatively, the heat-resistant layer 4 may be formed with a coating using a mixed solution containing a filler such as alumina/carboxymethyl cellulose.

Note that, in the coating step, an adhesive layer can be formed on a surface of the porous film, by applying a polyvinylidene fluoride/dimethyl acetamide solution (coating solution) on the porous film (application step) and allowing the coating solution to deposit (depositing step). The adhesive layer may be formed on the single surface of the porous film or on the both surfaces of the porous film.

A method of coating the porous film with a coating solution is not specifically limited, provided that uniform wet coating can be carried out by the method. As the method employed is a conventionally publicly known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film or a solid-content concentration in the coating solution.

The porous film containing a polyolefin as a base material, which is to be coated, is fixed to or transferred with a support. As the support used is a resin film, a metal belt, a drum or the like.

The separator 12 (heat-resistant separator) can thus be produced in which the heat-resistant layer 4 is stacked on the porous film. The separator thus produced is wound around a core having a cylindrical shape. Note that a subject to be produced by the above production method is not limited to the heat-resistant separator. The above production method does not necessarily include the coating step. In a case where no coating step is included in the production method, the subject to be produced is a separator including no heat-resistant layer.

<Slitting Apparatus>

The heat-resistant separator or the separator including no heat-resistant layer (hereinafter, referred to as "separator") preferably has a width (hereinafter, referred to as "product width") suitable for application products such as the lithium-ion secondary battery 1. Note, however, that the separator is produced so as to have a width that is equal to or larger than a product width, in view of an improvement in productivity. After the separator is once produced, the separator is cut (slit) into a separator(s) having the product width.

Note that the "width of the separator" means a dimension of the separator (i) in parallel with a plane along which the separator extends and (ii) in a direction perpendicular to a lengthwise direction of the separator. Hereinafter, a wide separator which has not been slit is referred to as an "original sheet," whereas particularly a separator which has been slit is referred to as a "slit separator." Note also that (i) "slitting" means to cut the separator in the lengthwise direction (a direction in which a film flows during production; MD: Machine direction) and (ii) "cutting" means to cut the separator in a transverse direction (TD). Note that the transverse direction (TD) means a direction which is (i) parallel to the plane along which the separator extends and (ii) substantially perpendicular to the machine direction (MD) of the separator.

Figure 4:
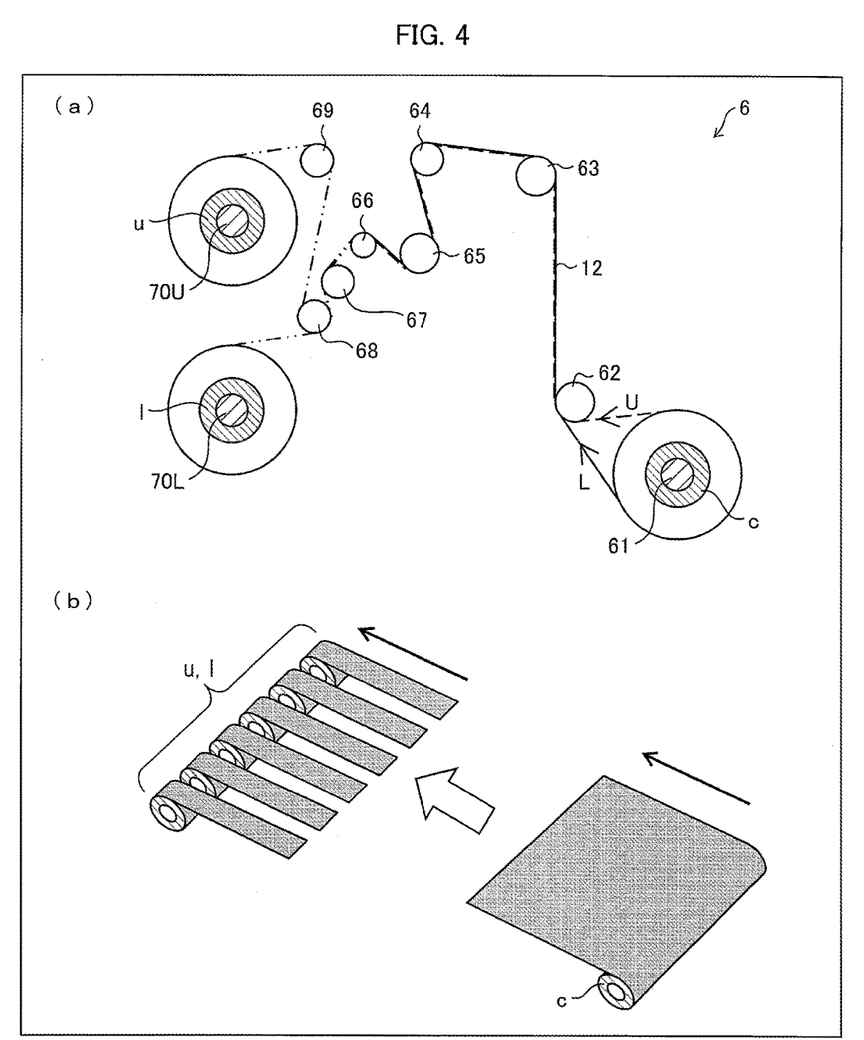
FIG. 4 schematically illustrates a configuration of a slitting apparatus for slitting a separator.

FIG. 4 schematically illustrates a configuration of a slitting apparatus 6 for slitting the separator. (a) of FIG. 4 illustrates an entire configuration, and (b) of FIG. 4 illustrates arrangements before and after slitting the original sheet.

As illustrated in (a) of FIG. 4, the slitting apparatus 6 includes a rotatably-supported cylindrical wind-off roller 61, rollers 62 through 69, and take-up rollers 70U and 70L.

(Before Slitting)

In the slitting apparatus 6, a cylindrical core c around which the original sheet is wrapped is fitted on the wind-off roller 61. As illustrated in (b) of FIG. 4, the original sheet is wound off from the core c to a route U or L. The original sheet which has been thus wound off is transferred to the roller 68 via the rollers 63 through 67. While the original sheet is being transferred, the original sheet is slit into a plurality of slit separators. Note that the number and arrangement of the rollers 62 through 69 can be changed in order to transfer the original sheet in a desired pathway.

(After Slitting)

As illustrated in (b) of FIG. 4, some of the plurality of slit separators are wound around respective cylindrical cores u (separator cores) which are fitted on the take-up roller 70U. Meanwhile, the others of the plurality of slit separators are wound around respective cylindrical cores 1 (separator cores), which are fitted on the take-up roller 70L. Note that (i) the slit separators each wound around in a roll manner and (ii) the respective cores u and 1 are, as a whole, referred to as a "roll (separator roll)".

The present invention relates to a core (separator core) around which a separator for a nonaqueous electrolyte secondary battery, such as the above-described slit separator, is wound or is to be wound and a separator roll obtained by winding a separator for a nonaqueous electrolyte secondary battery around the core.

<Structure of Core>

The following describes a core of an embodiment of the present invention with reference to FIGS. 5 to 8.

Figure 5:
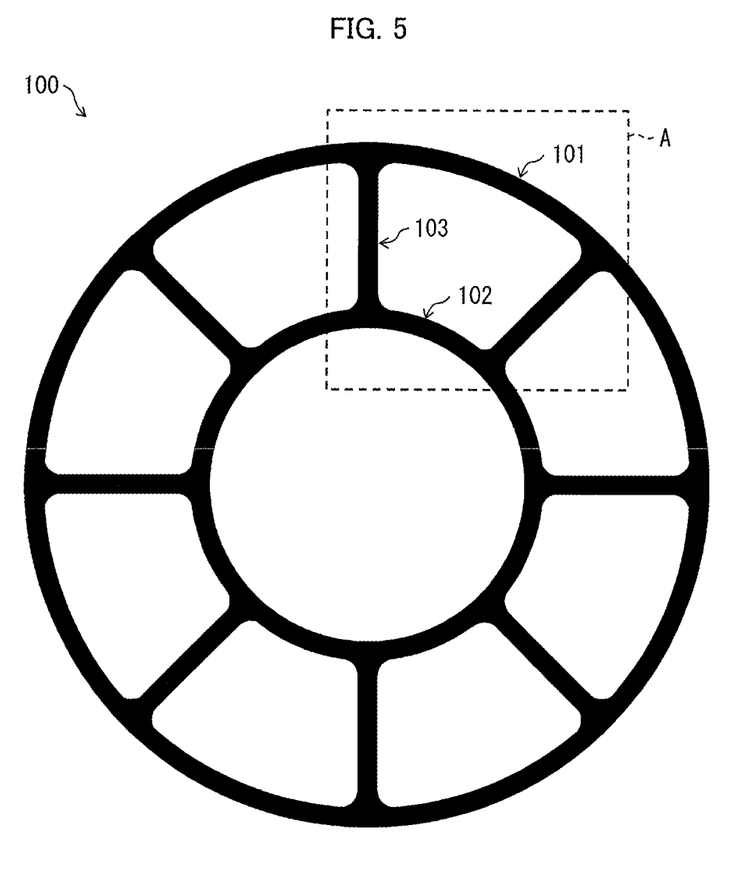
FIG. 5 is a front view of a separator core in accordance with an embodiment of the present invention.

FIG. 5 is a front view of a core in accordance with an embodiment of the present invention. It should be noted that the core illustrated in an embodiment of the present invention is merely an example and the actual size is not limited to such.

A core 100 includes an outer cylindrical part 101, an inner cylindrical part 102, and ribs 103. The outer cylindrical part 101 defines the outer peripheral surface of the core 100 on which the separator 12 is wound. The inner cylindrical part 102 is provided inside the outer cylindrical part 101 and serves as a bearing in which a shaft of, for example, a take-up roller for rotating the core is fitted. The ribs 103 are support parts provided between the outer cylindrical part 101 and the inner cylindrical part 102 so as to extend in radial directions and connect to the outer cylindrical part 101 and the inner cylindrical part 102.

In the present embodiment, the ribs 103 are equally spaced at eight locations around the circumference and perpendicular to the outer cylindrical part 101 and the inner cylindrical part 102. However, the number of ribs, the spaces between the ribs, and the like are not limited to such.

Furthermore, although the central axes of the outer cylindrical part 101 and the inner cylindrical part 102 preferably substantially coincide with each other, this does not imply any limitation. Furthermore, dimensions such as the thicknesses of the outer cylindrical part 101 and the inner cylindrical part 102, the width of the outer peripheral surface, and the radius of each cylindrical part may be determined appropriately depending on types of separator for a nonaqueous electrolyte secondary battery to be produced.

Materials that can be suitably used to make the core 100 are resins containing an ABS resin, a polyethylene resin, a polypropylene resin, a polystyrene resin, a polyester resin, and/or a vinyl chloride resin. It is possible to produce the core 100 from any of these resins by resin molding using a mold.

<Outer Curved Face and Inner Curved Face>

Figure 6:
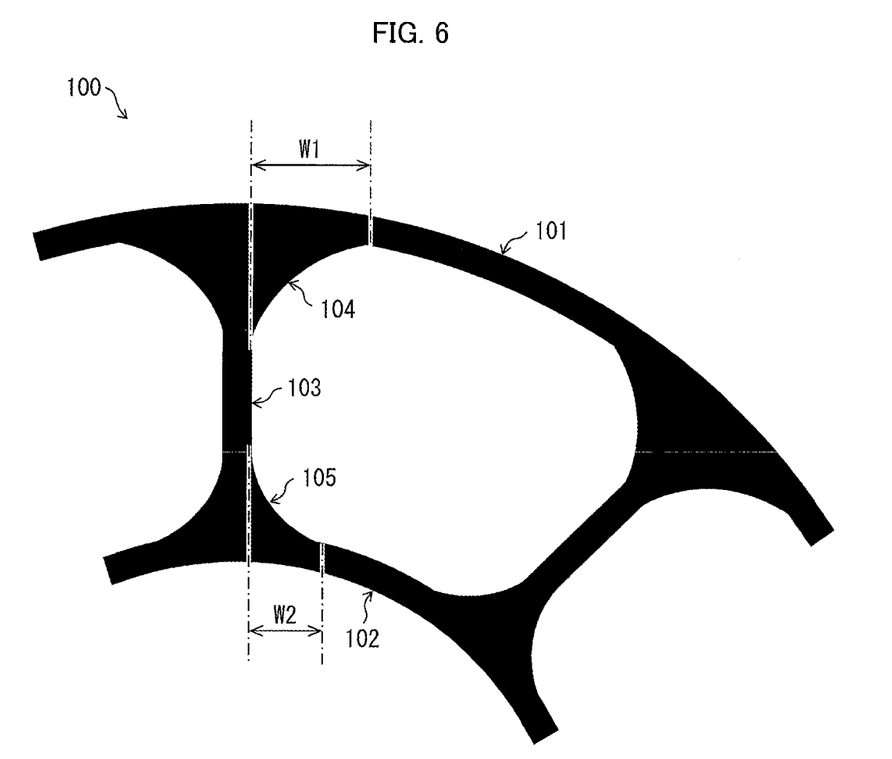
FIG. 6 is an enlarged view of region A in FIG. 5.

FIG. 6 is an enlarged view of region A in FIG. 5. It should be noted that, for convenience of description, outer and inner curved faces described below, which are illustrated in the drawings, are larger than the actual dimensions.

The core 100 further has an outer curved face 104 and an inner curved face 105. The outer curved face 104 lies between the inner peripheral surface of the outer cylindrical part 101 and the surface of a rib 103 which is connected to the inner peripheral surface of the outer cylindrical part 101. As illustrated in FIG. 6, the two surfaces, i.e., the inner peripheral surface of the outer cylindrical part 101 and the surface of the rib 103, are smoothly connected together by the outer curved face 104.

As with the outer curved face 104, the inner curved face 105 lies between the outer peripheral surface of the inner cylindrical part 102 and the surface of the rib 103 which is connected to the outer peripheral surface of the inner cylindrical part 102. As illustrated in FIG. 6, the two surfaces, i.e., the outer peripheral surface of the inner cylindrical part 102 and the surface of the rib 103, are smoothly connected together by the inner curved face 105.

The core 100 may have both the outer curved face 104 and the inner curved face 105 as illustrated in FIG. 6 or may have either one of the outer and inner curved faces 104 and 105.

<Radius of Curvature>

In an embodiment of the present invention, the rib 103 is connected to the outer and inner cylindrical parts 101 and 102 substantially at a right angle. Therefore, for example, each of the outer and inner curved faces 104 and 105 can be defined by a curved face substantially in the form of a quarter cylinder as illustrated in FIG. 6.

Assume that a distance from the point of contact between the outer curved face 104 and the outer cylindrical part 101 to the point of contact between the outer curved face 104 and the rib 103 is W1 and that a distance from the point of contact between the inner curved face 105 and the inner cylindrical part 102 to the point of contact between the inner curved face 105 and the rib 103 is W2, as illustrated in FIG. 6.

In the vicinities of the outer and inner curved faces 104 and 105, the inner peripheral surface of the outer cylindrical part 101 and the outer peripheral surface of the inner cylindrical part 102 can be regarded as substantially flat. Therefore, assuming that the radii of the outer and inner cylindrical parts 101 and 102 are much greater than W1 and W2, W1 and W2 can be regarded as representing the radii of curvature of the outer and inner curved faces 104 and 105, respectively.

By specifying each of the outer and inner curved faces 104 and 105 by the shape of part of the curved surface of a cylinder in this way, it is possible to readily change design such as the size of a curved face by changing the radius of curvature of the outer curved face 104 or the inner curved face 105.

In practice, the shape of the curved face is not limited to the shape of the curved surface of a quarter cylinder as described above. The outer and inner curved faces 104 and 105 may have any shape, provided that the faces are smoothly curved and do not have any sharp point.

The outer and inner curved faces 104 and 105 are not limited to those illustrated in FIG. 6. A face between another rib 103 and the outer cylindrical part 101 or between the another rib 103 and the inner cylindrical part 102 may also have a similar shape. Alternatively, such faces of other ribs 103 may have a different shape, provided that any one of such faces has the above-described curved shape.

<Cleaning of Core>

Figure 7:
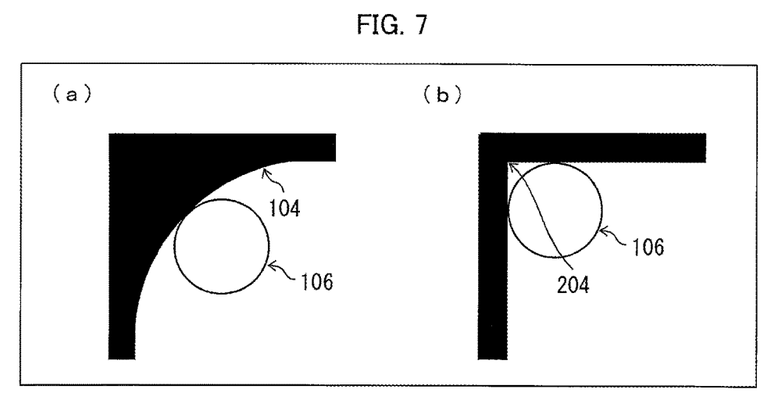
FIG. 7 schematically illustrates how a separator core of an embodiment of the present invention and a separator core of a comparative example are cleaned.

FIG. 7 schematically illustrates how a separator core of an embodiment of the present invention and a separator core of a comparative example are cleaned.

A used core, from which a separator has been wound off, may have, for example, a conductive foreign substance attached thereto. If the foreign substance adheres to the separator wound around the core, a battery produced using this separator may have a short circuit. Therefore, it is necessary to perform a cleaning step to clean the core and remove the foreign substance before another separator is wound around the core. The method of cleaning is not particularly limited. An example is to wipe the core with a cloth with an agent to rub off the foreign substance.

<Advantageous Effects of the Present Invention>

(a) of FIG. 7 illustrates how to clean the outer curved face 104 of the core 100 of an embodiment of the present invention by bringing a cleaning member 106 into contact with the outer curved face 104. It should be noted that, for convenience of description, (a) of FIG. 7 shows an enlarged view of the outer curved face 104 and does not illustrate the other members of the core 100.

On the other hand, (b) of FIG. 7, which shows a comparative example, illustrates how to clean a core having a corner 204 that does not have a smoothly curved face and that is constituted by surfaces connected substantially at a right angle. It should be noted that, as with (a) of FIG. 7, the other members of the core of the comparative example are not illustrated.

Since the outer curved face 104 has a smoothly curved shape as illustrated in (a) of FIG. 7, the cleaning member 106 can make contact with the entire surface of the outer curved face 104. With this, no gap forms between the cleaning member 106 and the corner 204 unlike that illustrated in (b) of FIG. 7, and therefore it is possible to wipe off the foreign substance attached to the outer curved face 104 with the use of the cleaning member 106.

This makes it possible to reduce remaining foreign substances attached to the outer curved face 104 and thus prevent the foreign substances from adhering to a separator for a nonaqueous electrolyte secondary battery to be produced, resulting in an improvement in quality. Furthermore, since foreign substances are readily removed, the cleaning step may be simplified.

<Value of Radius of Curvature>

The same effects as described above can also be applied to the inner curved face 105. It should be noted, here, that the inner curved face 105 is on the outer peripheral surface of the inner cylindrical part 102 whereas the outer curved face 104 is on the inner peripheral surface of the outer cylindrical part 101. Therefore, it is not easy for the cleaning member to make contact with the outer curved face 104 as compared to the inner curved face 105.

Therefore, W1, i.e., the radius of curvature of the outer curved face 104, is preferably greater than W2, i.e., the radius of curvature of the inner curved face 105. This achieves design of a core that can be cleaned more efficiently.

Specifically, it is preferable that W1 be 2.5 mm or greater and W2 be 2 mm or greater. This makes it possible, when a cloth with an agent is used as the cleaning member, to make a space large enough for the cloth or a person's finger to enter and thus possible to more efficiently clean the core.

<Roll and Production Method>

Figure 8:
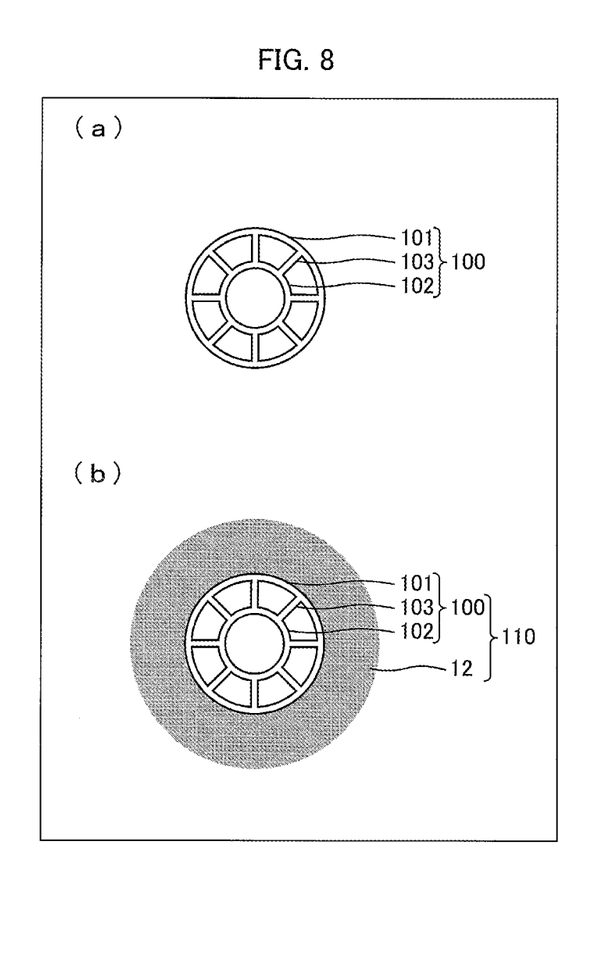
FIG. 8 shows a front view of a separator core in accordance with an embodiment of the present invention and a front view of a separator roll obtained by winding a separator for a nonaqueous electrolyte secondary battery around a separator core in accordance with an embodiment of the present invention.

FIG. 8 shows a front view of a core and a front view of a separator roll obtained by winding a separator around a core.

The shaft of a take-up roller or the like is fitted in the inner cylindrical part 102 of the core 100 illustrated in (a) of FIG. 8 and, while the core 100 is rotated, the separator 12 is wound around the outer cylindrical part 101 with constant tension, such that a separator roll 110 illustrated in (b) of FIG. 8 is produced.

The above-described core 100 can be used as, for example, a core u or 1 of the slitting apparatus 6 illustrated in FIG. 4. That is, the separator 12 can be wound around the core 100 in a winding step similar to that described earlier.

Since the core 100 has no or few foreign substances remaining thereon, the separator roll 110, which is obtained by winding the separator 12 around the core 100, provides a high-quality separator 12 with no or few foreign substances attached thereto.

In order to attain the above object, a separator core in accordance with an aspect of the present invention is a separator core around which a separator for a nonaqueous electrolyte secondary battery is wound or is to be wound, including: an outer cylindrical part; an inner cylindrical part provided inside the outer cylindrical part; and support parts that are provided between the outer cylindrical part and the inner cylindrical part and that extend in radial directions to connect to the outer cylindrical part and the inner cylindrical part, wherein at least one of (i) a connection between a surface of at least one of the support parts and an inner peripheral surface of the outer cylindrical part and (ii) a connection between the surface of the at least one of the support parts and an outer peripheral surface of the inner cylindrical part is made smoothly by a curved face.

With this configuration, cleaning is easy and thus it is possible to provide a core that will have no or few remaining foreign substances. This contributes to an improvement in quality of a separator for a nonaqueous electrolyte secondary battery to be produced using the core and simplification of cleaning operation.

The separator core may be arranged such that the curved face has a shape of part of a curved surface of a cylinder.

With this configuration, it is possible to specify the design of the curved face by a radius of curvature. Therefore, it is possible to easily change the shape by simply changing the radius of curvature.

The separator core may be arranged such that the curved face between the surface of the at least one of the support parts and the inner peripheral surface of the outer cylindrical part has a larger radius of curvature than the curved face between the surface of the at least one of the support parts and the outer peripheral surface of the inner cylindrical part.

With this configuration, it is possible to design a core that can be cleaned more efficiently.

The separator core may be arranged such that the curved face between the surface of the at least one of the support parts and the inner peripheral surface of the outer cylindrical part has a radius of curvature of 2.5 mm or greater.

The separator core may be arranged such that the curved face between the surface of the at least one of the support parts and the outer peripheral surface of the inner cylindrical part has a radius of curvature of 2 mm or greater.

With this configuration, it is possible to make a space large enough for a cleaning member to clean the corner.

The separator core in accordance with an aspect of the present invention may be made from a material containing an ABS resin, a polyethylene resin, a polypropylene resin, a polystyrene resin, a polyester resin, and/or a vinyl chloride resin.

With this configuration, it is possible to produce a core by resin molding using a mold.

A separator roll in accordance with another aspect of the present invention includes: the above-described separator core; and a separator wound around the separator core.

With this configuration, it is possible to produce a separator roll that supplies a high-quality separator for a nonaqueous electrolyte secondary battery to which foreign substances are less likely to attach.

A method for producing a separator roll in accordance with a further aspect of the present invention is a method for producing a separator roll by winding another separator for a nonaqueous electrolyte secondary battery around the separator core. The method includes: a cleaning step of cleaning the separator core from which a separator for a nonaqueous electrolyte secondary battery has been wound off; and a winding step of winding the another separator for a nonaqueous electrolyte secondary battery around the separator core after the cleaning step.

With this configuration, it is possible to produce a separator roll in which a high-quality separator for a nonaqueous electrolyte secondary battery, to which foreign substances are less likely to attach, is wound.

The present invention is not limited to the embodiments described above, but can be variously altered within the scope of the claims.

REFERENCE SIGNS LIST

1 Lithium-ion secondary battery
2 External device
3 Lithium ion
4 Heat-resistant layer
11 Cathode
12 Separator
12a Heat-resistant separator
13 Anode
100 Core
101 Outer cylindrical part
102 Inner cylindrical part
103 Rib
104 Outer curved face
105 Inner curved face
106 Cleaning member
110 Separator roll
204 Corner

The invention claimed is:

1. A separator core around which a separator for a nonaqueous electrolyte secondary battery is wound or is to be wound, comprising:
   an outer cylindrical part;
   an inner cylindrical part provided inside the outer cylindrical part; and
   support parts that are provided between the outer cylindrical part and the inner cylindrical part and that extend in radial directions to connect to the outer cylindrical part and the inner cylindrical part, wherein at least one of (i) a connection between a surface of at least one of the support parts and an inner peripheral surface of the outer cylindrical part and (ii) a connection between the surface of the at least one of the support parts and an outer peripheral surface of the inner cylindrical part is made smoothly by a curved face.

2. The separator core according to claim 1, wherein the curved face has a shape of part of a curved surface of a cylinder.

3. The separator core according to claim 1, wherein the curved face between the surface of the at least one of the support parts and the inner peripheral surface of the outer cylindrical part has a larger radius of curvature than the curved face between the surface of the at least one of the support parts and the outer peripheral surface of the inner cylindrical part.

4. The separator core according to claim 1, wherein the curved face between the surface of the at least one of the support parts and the inner peripheral surface of the outer cylindrical part has a radius of curvature of 2.5 mm or greater.

5. The separator core according to claim 1, wherein the curved face between the surface of the at least one of the support parts and the outer peripheral surface of the inner cylindrical part has a radius of curvature of 2 mm or greater.

6. The separator core according to claim 1, which is made from a material containing an ABS resin, a polyethylene resin, a polypropylene resin, a polystyrene resin, a polyester resin, and/or a vinyl chloride resin.

7. A separator roll comprising:
the separator core as set forth in claim 1; and
a separator for a nonaqueous electrolyte secondary battery wound around the separator core.

8. The separator roll according to claim 7, wherein the separator comprises a porous film and a heat-resistant layer.

9. The separator roll according to claim 8, wherein the heat-resistant layer contains a wholly aromatic polyamide.

10. The separator roll according to claim 9, wherein the separator further comprises an adhesive layer.

11. The separator roll according to claim 8, wherein the separator further comprises an adhesive layer.

12. The separator roll according to claim 7, wherein the separator comprises a porous film and an adhesive layer.

* * * * *